United States Patent
Tamaki

(10) Patent No.: US 9,069,209 B2
(45) Date of Patent: Jun. 30, 2015

(54) LIQUID CRYSTAL DISPLAY

(71) Applicant: Japan Display Inc., Tokyo (JP)

(72) Inventor: Masaya Tamaki, Kanagawa (JP)

(73) Assignee: JAPAN DISPLAY INC., Tokyo (JP)

( * ) Notice: Subject to any disclaimer, the term of this patent is extended or adjusted under 35 U.S.C. 154(b) by 85 days.

(21) Appl. No.: 13/743,013

(22) Filed: Jan. 16, 2013

(65) Prior Publication Data

US 2013/0235301 A1 Sep. 12, 2013

(30) Foreign Application Priority Data

Mar. 12, 2012 (JP) ................................ 2012-054242

(51) Int. Cl.
*G02F 1/1335* (2006.01)
*G02F 1/133* (2006.01)
*G02F 1/13363* (2006.01)

(52) U.S. Cl.
CPC ...... *G02F 1/13363* (2013.01); *G02F 1/133504* (2013.01); *G02F 2203/02* (2013.01)

(58) Field of Classification Search
CPC .......... G02F 1/133504; G02F 1/13363; G02F 2001/133562; G02F 1/133553
USPC .......................................... 349/113, 33, 137
See application file for complete search history.

(56) References Cited

U.S. PATENT DOCUMENTS

| 5,619,356 A * | 4/1997 | Kozo et al. ....................... 349/99 |
| 2005/0248698 A1* | 11/2005 | Okamoto et al. ............... 349/98 |
| 2011/0164205 A1* | 7/2011 | Kashiwagi ...................... 349/96 |

FOREIGN PATENT DOCUMENTS

CN 1537240 A 10/2004

OTHER PUBLICATIONS

Taiwan Office Action for corresponding patent application No. 101141632 issued on Dec. 26, 2014.

* cited by examiner

*Primary Examiner* — Nathanael R Briggs
(74) *Attorney, Agent, or Firm* — K&L Gates LLP

(57) ABSTRACT

A liquid crystal display which is a reflective liquid crystal display includes: a front substrate; a rear substrate; and a liquid crystal material layer disposed between the front substrate and the rear substrate, wherein an optical design is performed such that an extreme value of a liquid crystal applied voltage-reflectance curve in a state of being observed from a normal observing direction is shifted further to a lower voltage side than an extreme value of a liquid crystal applied voltage-reflectance curve in a state of being observed from a direction deviated from the normal observing direction, and wherein an anisotropic scatterer disposed such that a direction where scattering characteristics are the maximum is aligned with the normal observing direction is provided on the front substrate side.

7 Claims, 16 Drawing Sheets

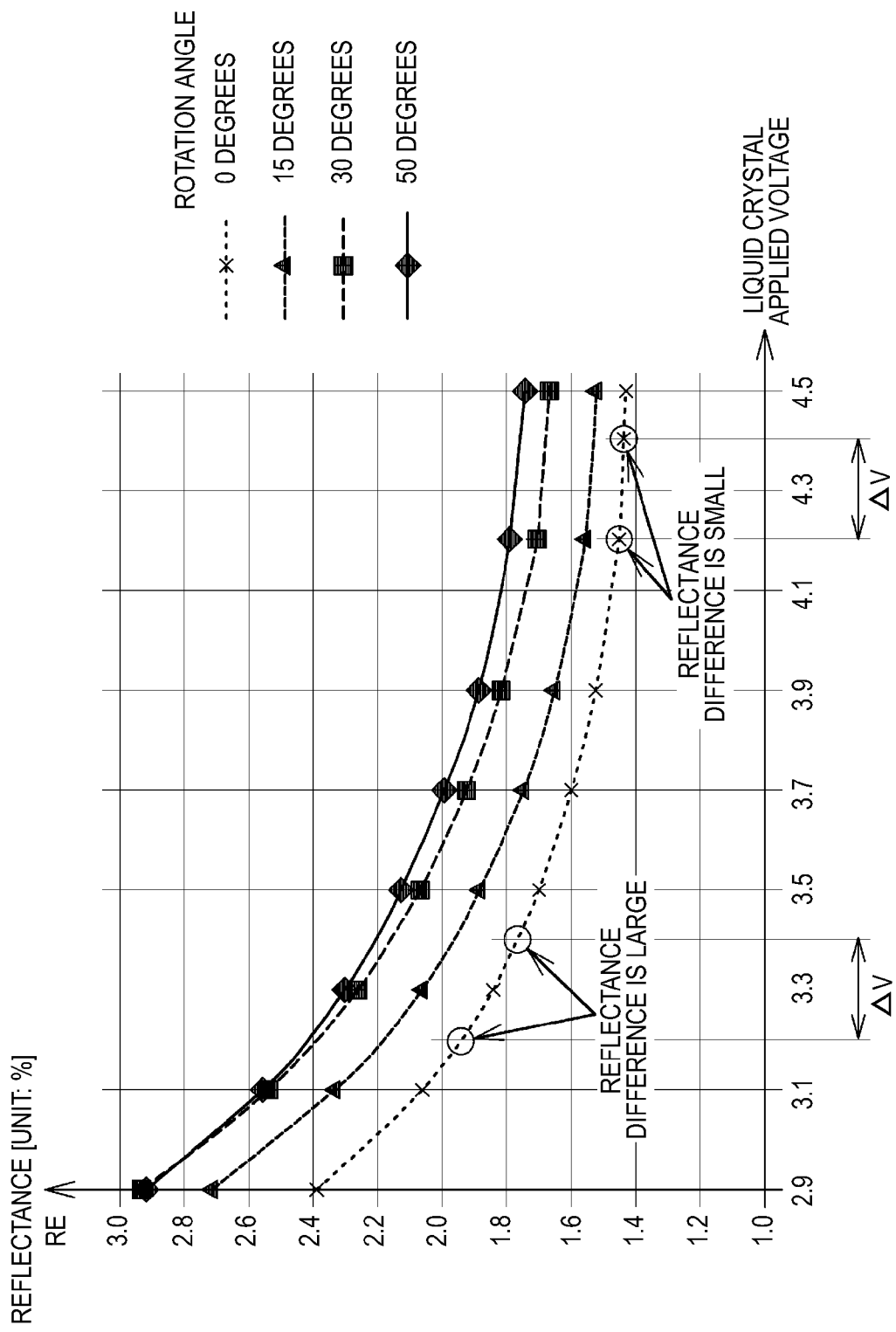

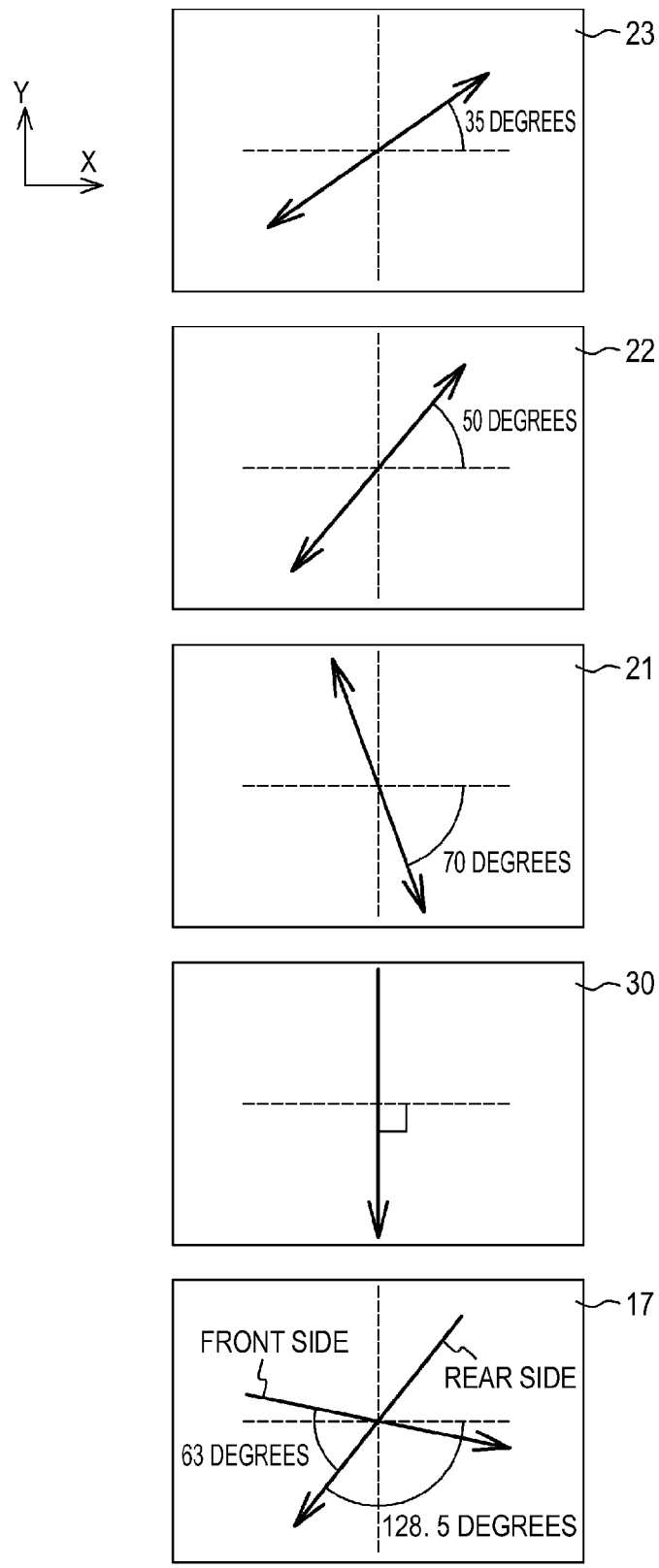

*FIG.9A*
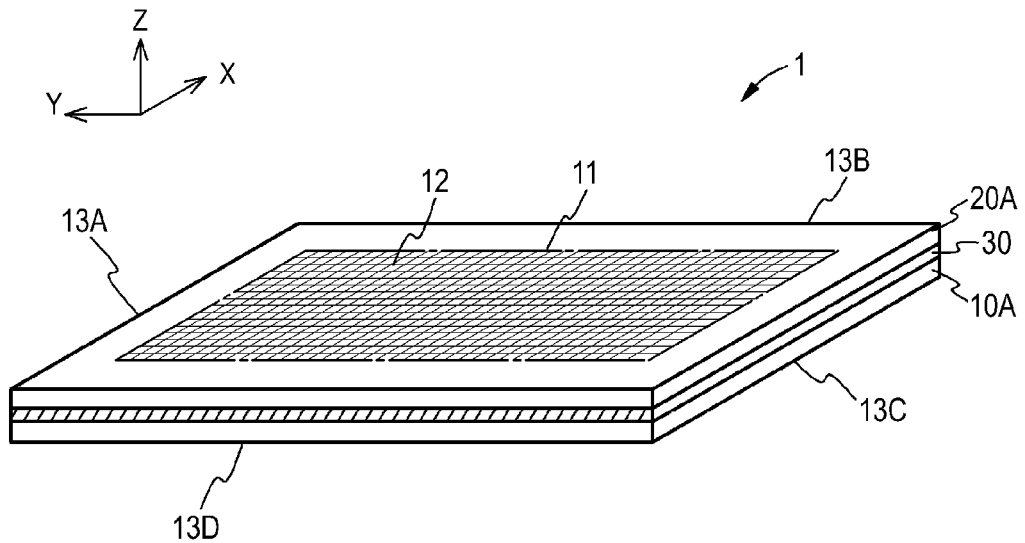
*FIG.9B*
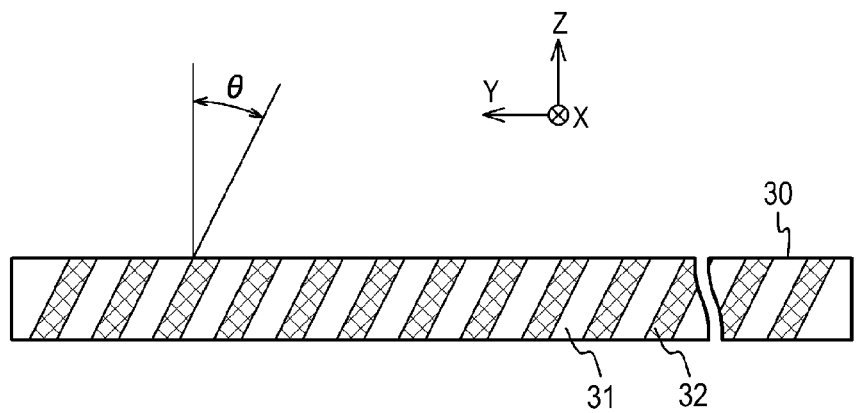
*FIG.9C*  *FIG.9D*
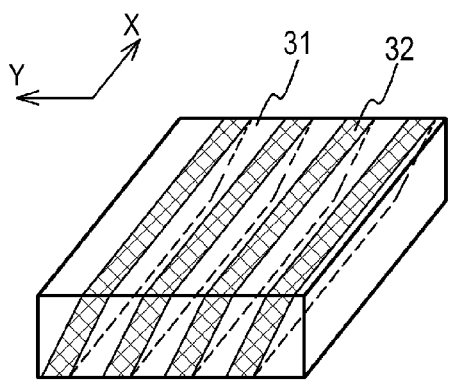
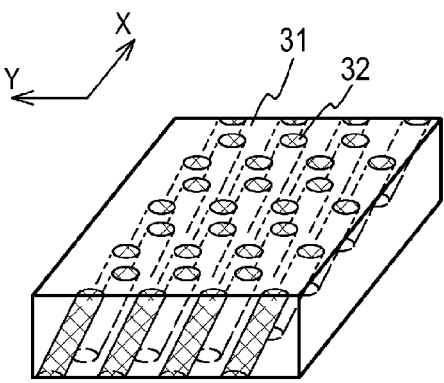

LIQUID CRYSTAL DISPLAY

CROSS REFERENCES TO RELATED APPLICATIONS

The present application claims priority to Japanese Priority Patent Application JP 2012-054242 filed in the Japan Patent Office on Mar. 12, 2012, the entire content of which is hereby incorporated by reference.

BACKGROUND

The present disclosure relates to a liquid crystal display. More specifically, the present disclosure relates to a reflective liquid crystal display which displays images by controlling the reflectance of ambient light.

A reflective liquid crystal display includes a pixel electrode or a reflective film which reflects ambient light, and changes states of a liquid crystal material layer so as to control the reflectance of ambient light, thereby displaying images. The reflective liquid crystal display can achieve low power consumption, a thinner display, and light weight, and is thus used as, for example, a display device of a portable electronic apparatus. In addition, for example, as disclosed in JP-A-2005-148424, there has been proposed a liquid crystal display of a so-called area ratio grayscale method in which each pixel (each subpixel in color display) has a set of pixel electrodes, a voltage applied to the set of pixel electrodes is controlled for each pixel electrode so as to vary the area of a region provided for display, thereby performing grayscale display.

In the reflective liquid crystal display, for example, if a potential of a common electrode varies due to exposure to ambient light for a long time or the like, a difference occurs in voltages applied to the liquid crystal material layer (liquid crystal applied voltage) in positive polarity side display and negative polarity side display when polarity inversion driving is performed, and thereby flickering occurs. Therefore, there is a demand for a configuration in which flickering is difficult to view with respect to variations in a potential of the common electrode. In order to make flickering difficult to view, it is effective to perform a design such that the vicinity of an extreme value of a liquid crystal applied voltage-reflectance curve is set as an operation point, and thus a brightness variation is not viewed even if some potential variations occur.

SUMMARY

However, typically, if the vicinity of an extreme value of the liquid crystal applied voltage-reflectance curve is to be set as an operation point, a liquid crystal applied voltage has to be set to be high, and thus power consumption is increased. In order to prevent this, it is possible to reduce a liquid crystal applied voltage by changing a design of optical members or the like forming the liquid crystal display; however, in this case, there is a problem in that, when the liquid crystal display is observed from a normal observing direction, flickering is not viewed, but, when the liquid crystal display is observed from a deviated direction, flickering is viewed.

It is therefore desirable to provide a reflective liquid crystal display, capable of achieving a low voltage of a liquid crystal applied voltage, in which flickering is not viewed in both a case where the liquid crystal display is observed from a normal observing direction and a case where the liquid crystal display is observed from a deviated direction.

An embodiment of the present disclosure is directed to a liquid crystal display which is a reflective liquid crystal display, including a front substrate; a rear substrate; and a liquid crystal material layer disposed between the front substrate and the rear substrate, wherein an optical design is performed such that an extreme value of a liquid crystal applied voltage-reflectance curve in a state of being observed from a normal observing direction is shifted further to a lower voltage side than an extreme value of a liquid crystal applied voltage-reflectance curve in a state of being observed from a direction deviated from the normal observing direction, and wherein an anisotropic scatterer disposed such that a direction where scattering characteristics are the maximum is aligned with the normal observing direction is provided on the front substrate side.

In the liquid crystal display according to the embodiment of the present disclosure, an optical design is performed such that an extreme value of a liquid crystal applied voltage-reflectance curve in a state of being observed from a normal observing direction is shifted further to a lower voltage side than an extreme value of a liquid crystal applied voltage-reflectance curve in a state of being observed from a direction deviated from the normal observing direction, and an anisotropic scatterer disposed such that a direction where scattering characteristics are the maximum is aligned with the normal observing direction is provided on the front substrate side. Thereby, it is possible to achieve a low voltage for a liquid crystal applied voltage and to thereby reduce power consumption. In addition, since the strength of light in a direction deviated from the normal observing direction is relatively weakened, flickering is not viewed even if the liquid crystal display is observed from a direction deviated from the normal observing direction.

Additional features and advantages are described herein, and will be apparent from the following Detailed Description and the figures.

BRIEF DESCRIPTION OF THE FIGURES

FIG. 4 is a schematic graph illustrating how the relationship between the liquid crystal applied voltage and the reflectance varies when the liquid crystal display in which a certain design condition is applied to an optical member or the like is rotated.

FIG. 5 is a schematic diagram illustrating an optical design of the liquid crystal display.

FIG. 9A is a schematic perspective view illustrating a structure of the liquid crystal display.

FIG. 9B is a schematic cross-sectional view illustrating a structure of an anisotropic scatterer according to the first embodiment.

FIGS. 9C and 9D are schematic perspective views illustrating a disposition of a low refractive index region and a high refractive index region in the anisotropic scatterer.

DETAILED DESCRIPTION

Figure 1A:
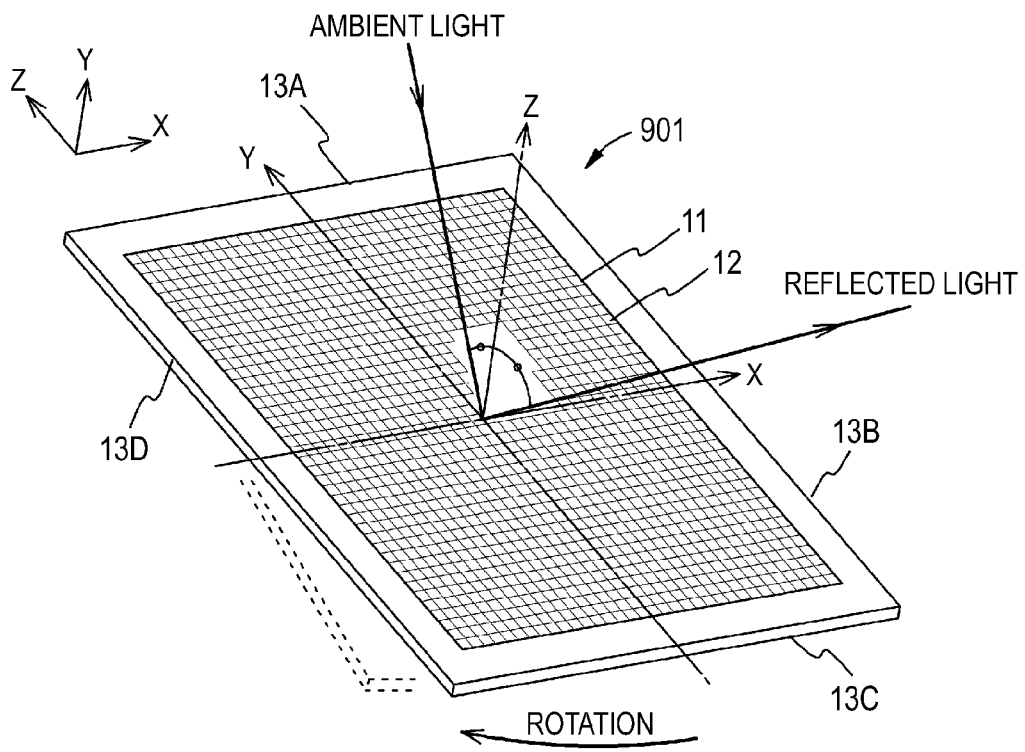
FIG. 1A is a schematic perspective view of a liquid crystal display according to a reference example.

Hereinafter, the present disclosure will be described based on embodiments. The present disclosure is not limited to the embodiment, and various numerical values or materials in the embodiment are examples. In the following description, the same constituent elements or constituent elements having the same function are given the same reference numerals, and repeated description will be omitted. In addition, the description will be made in the following order.

1. Description of overall liquid crystal display according to embodiment of present disclosure 2. Description of liquid crystal display according to reference example 3. First embodiment (and others)

[Description of Overall Liquid Crystal Display According to Embodiment of Present Disclosure]

As described above, in the liquid crystal display according to the embodiment of the present disclosure, an optical design is performed such that an extreme value of a liquid crystal applied voltage-reflectance curve in a state of being observed from a normal observing direction is shifted further to a lower voltage side than an extreme value of a liquid crystal applied voltage-reflectance curve in a state of being observed from a direction deviated from the normal observing direction. This optical design can be realized by appropriately setting, for example, the specification of an optical member such as a phase difference plate used in the liquid crystal display, or the specification of a surface treatment of an alignment layer which defines an alignment state of liquid crystal molecules forming the liquid crystal material layer.

In the liquid crystal display according to the embodiment of the present disclosure, an in-plane direction region of the anisotropic scatterer may be formed as a region in which low refractive index regions and high refractive index regions are mixed. The anisotropic scatterer may be configured to be disposed such that ambient light incident from the outside is scattered when transmitted through the anisotropic scatterer, but is preferably configured to be disposed such that ambient light which is reflected on the rear substrate side is incident on the anisotropic scatterer and is scattered when emitted to the outside. Since reflectance of light is higher in the latter configuration, an image observed from a direction deviated from the normal observing direction is relatively darkened, and thus flickering when observation is performed from the deviated direction is not viewed.

In the liquid crystal display according to the embodiment of the present disclosure including the above-described preferable configurations, the anisotropic scatterer may be formed by laminating a plurality of scattering members.

Alternatively, in the liquid crystal display according to the embodiment of the present disclosure including the above-described preferable configurations, the liquid crystal display may perform grayscale display using an area ratio grayscale method. For example, each pixel (in color display, each sub-pixel) may include a set of pixel electrodes of which the area is increased by about twice, and a voltage applied to the set of the pixel electrodes may be controlled for each pixel electrode so as to vary the area of a region provided for display.

The anisotropic scatterer may be formed using a composition or the like including a photoreactive compound. For example, a base material including a composition expressing some extent of reflectance variations before and after photo-polymerization is irradiated with light such as ultraviolet rays from a predetermined direction, thereby obtaining an anisotropic scatterer. As a material forming the composition, a material producing some extent of reflectance variations in a portion undergoing photoreaction and a portion not undergoing the photoreaction may be appropriately selected and used from a well-known material such as a polymer with functional groups for radical polymerization or cationic polymerization.

Alternatively, for example, a base material including a composition in which a photoreactive compound and non-photoreactive polymer are mixed is irradiated with light such as ultraviolet rays from a predetermined direction, thereby obtaining an anisotropic scatterer. The non-photoreactive polymer may be appropriately selected and used from well-known materials such as, for example, an acryl resin or a styrene resin.

The base material including the composition may be obtained by coating the composition on a film-shaped base made of, for example, a polymer material using a well-known coating method.

An in-plane direction region of the anisotropic scatterer including the above-described composition may be formed as a region in which low refractive index regions and high refractive index regions are mixed. Typically, the anisotropic scatterer is formed such that the boundary between the low refractive index region and the high refractive index region forms a predetermined angle with respect to the thickness direction of the anisotropic scatterer. Depending on cases, this angle may be continuously varied in the in-plane direction.

A refractive index difference between the low refractive index region and the high refractive index region is typically preferably 0.01 or more, more preferably 0.05 or more, and most preferably 0.10 or more.

Although, depending on a material forming the anisotropic scatterer or a manufacturing method thereof, the portion undergoing photoreaction and the portion not undergoing photoreaction may respectively form louver-shape regions, for example, as shown in FIG. 9C described later, or may form a columnar region and a peripheral region surrounding the columnar region as shown in FIG. 9D described later.

The liquid crystal display according to the embodiment of the present disclosure may perform monochrome display and color display. The pixel electrode itself may reflect light as a reflective electrode, or a reflective film may reflect light through a combination of a transparent pixel electrode and the reflective film. An operation mode of the liquid crystal display is not particularly restricted as long as there is no hindrance in a display operation as the reflective type. For example, the liquid crystal display may be driven in a so-called VA mode or ECB mode.

For example, a transflective liquid crystal display having both a reflective display region and a transmissive display region in a pixel is well known. Depending on cases, the liquid crystal display may be a transflective liquid crystal display. In other words, the "reflective type" also includes the "transflective type".

A shape of the liquid crystal display is not particularly restricted, and may be a transversely long rectangular shape or a longitudinally long rectangular shape. When the number M×N of pixels of the liquid crystal display is indicated by (M,N), for example, in a case of the transversely long rectangular shape, several resolutions for image display, such as, (640,480), (800,600), and (1024,768) are exemplified as a value of (M,N), and, in a case of the longitudinally long rectangular shape, resolutions obtained by exchanging the values are exemplified, but the number thereof is not limited to these values.

A driving circuit driving the liquid crystal display may include various circuits. They may be formed using well-known circuit elements.

A variety of conditions shown in the present specification are satisfied in a case of being substantially established as well as in a case of being strictly established. Presence of a variety of variations occurring in design or manufacturing is allowed.

[Description of Liquid Crystal Display According to Reference Example]

First, for better understanding of the present disclosure, a liquid crystal display according to a reference example will be described.

Figure 1B:
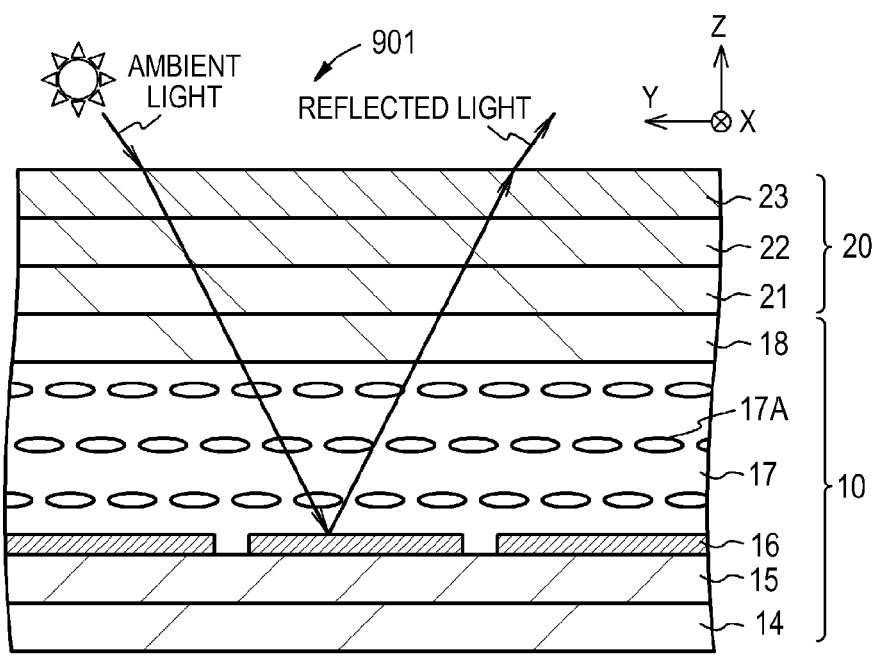
FIG. 1B is a schematic cross-sectional view of the liquid crystal display according to the reference example.

FIG. 1A is a schematic perspective view of a liquid crystal display according to the reference example. FIG. 1B is a schematic cross-sectional view of the liquid crystal display according to the reference example.

The liquid crystal display 901 according to the reference example is a reflective liquid crystal display having a display region 11 in which pixels 12 are arranged. The liquid crystal display 901 is driven by driving circuits and the like (not shown). Ambient light such as, for example, sunlight or illumination light is incident on the display region 11. For convenience of the description, the display region 11 is set to be parallel to the X-Y plane, and a direction where an image is observed is set to +Z direction. The description will be made assuming that the ambient light is incident with a predetermined polar angle (for example, 30 degrees) from a direction of the azimuth 90 degrees, but this is only an example.

The liquid crystal display 901 has a rectangular shape, and sides thereof are indicated by the reference numerals 13A, 13B, 13C and 13D. The side 13C is a front side, and the side 13A is a side opposite to the side 13C. For example, the sides 13A and 13C are about 12 [cm], and the sides 13B and 13D are about 16 [cm], but the lengths thereof are not limited to these values.

As shown in FIG. 1B, the liquid crystal display 901 includes a front substrate 18, a rear substrate 14, and a liquid crystal material layer 17 disposed between the front substrate 18 and the rear substrate 14. The reference numeral 17A schematically indicates liquid crystal molecules forming the liquid crystal material layer 17. The liquid crystal material layer 17 is provided at a predetermined thickness using spacers and the like (not shown). The reference numeral 10 shown in FIG. 1B indicates a portion including the front substrate 18, the rear substrate 14, and the liquid crystal material layer 17 disposed between the front substrate 18 and the rear substrate 14 in the liquid crystal display 901. Similarly, the reference numeral 20 indicates a portion including a ¼ waveform plate 21, a ½ waveform plate 22, and a polarization plate 23 in the liquid crystal display 901. The liquid crystal display 901 is driven, for example, in an ECB mode.

For example, a planarization film 15 made of a polymer material such as an acryl resin is formed on the rear substrate 14 made of a glass material, and pixel electrodes (reflective electrodes) 16 made of a metal material such as aluminum is formed thereon.

A surface of the pixel electrode 16 is formed in a specular form. For example, an element such as a TFT is connected to the pixel electrode 16 in order to control electrical connection between signal lines for supplying an image signal and the pixel electrode 16. In addition, in FIG. 1B, TFTs, various wires such as signal lines or scanning lines for controlling conduction states of the TFTs, a common electrode or color filters provided on the front substrate 18, an alignment layer for defining an initial alignment state of the liquid crystal material layer 17, and the like are not shown.

The ambient light incident from the outside is linearly polarized in a predetermined direction by the polarization plate 23, rotates its polarization plane by 90 degrees in the ½ waveform plate 22, and is then circularly polarized by the ¼ waveform plate 21. The ambient light which has been circularly polarized is transmitted through the liquid crystal material layer 17 and is reflected by the pixel electrode 16. The reflected ambient light is transmitted through the liquid crystal material layer 17, further transmitted through the ¼ waveform plate 21 and the ½ waveform plate 22, arrives at the polarization plate 23, and is emitted toward the outside. It is possible to control an amount where ambient light reflected by the pixel electrode 16 is transmitted through the polarization plate 23 by controlling a voltage applied to the pixel electrode 16 or the like so as to control an alignment state of the liquid crystal molecules 17A in the liquid crystal material layer 17.

Figure 2A:
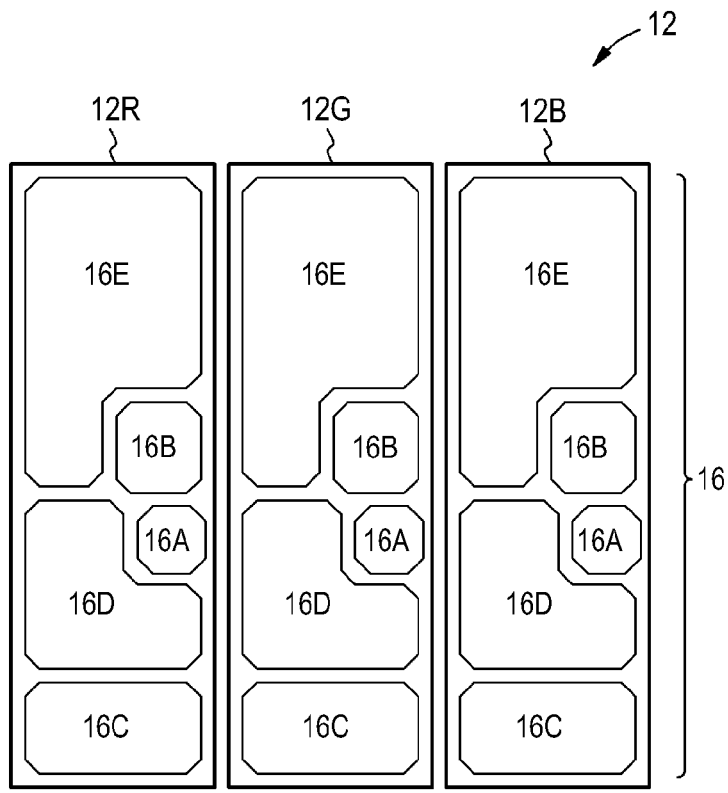
FIG. 2A is a schematic plan view illustrating a structure of a pixel.
Figure 2B:
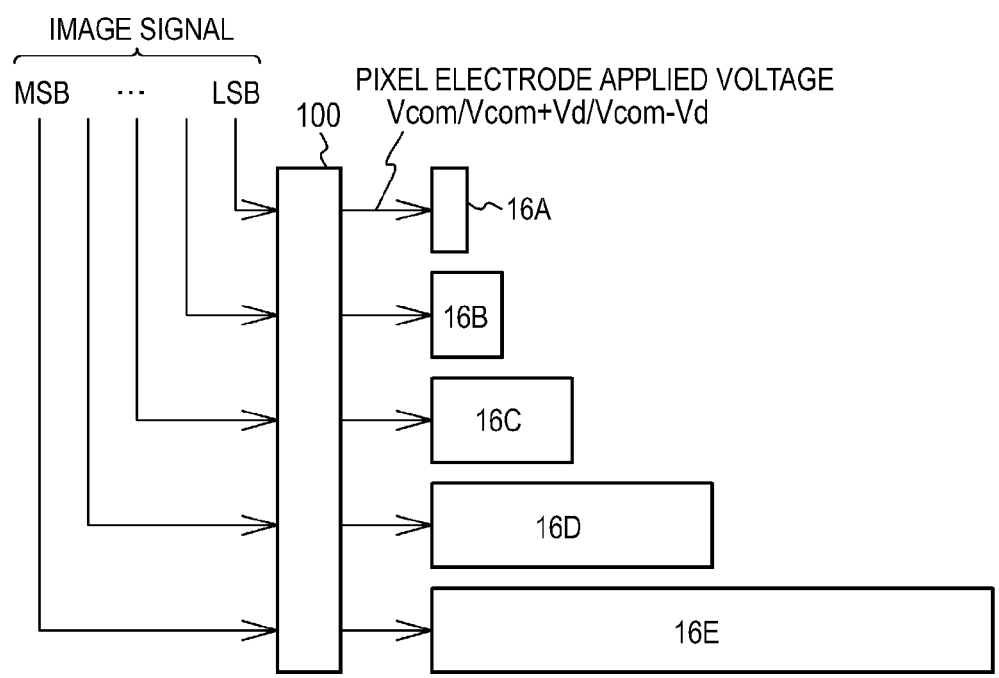
FIG. 2B is a schematic diagram illustrating a method of controlling a voltage applied to a pixel electrode.

FIG. 2A is a schematic plan view illustrating a structure of the pixel. FIG. 2B is a schematic diagram illustrating a method of controlling a voltage applied to the pixel electrode.

As shown in FIG. 2A, the pixel 12 includes a set of a red display subpixel 12R, a green display subpixel 12G, and a blue display subpixel 12B. The liquid crystal display 901 performs grayscale display using an area ratio grayscale method. For this reason, the pixel electrodes 16 of each subpixel include a set of electrodes of which the area is increased by about twice. FIG. 2A shows an example of the case of including a set of five electrodes 16A, 16B, 16C, 16D and 16E. Voltages applied to the electrodes 16A, 16B, 16C, 16D and 16E are controlled, for example, depending on values of corresponding bits of a digitalized image signal.

With reference to FIG. 2B, a description will be made of a configuration of a case where control is performed based on, for example, an image signal of 5 bits. The electrode 16E of which the area is the largest is controlled based on MSB of the image signal, and, as the area is decreased, the electrodes are controlled based on lower bits. The electrode 16A of which the area is the smallest is controlled based on LSB of the image signal. Specifically, one of, for example, a voltage $V_{com}$ with the same value as a voltage applied to the common electrode, a voltage $V_{com}+V_d$ with a positive polarity, and a voltage $V_{com}-V_d$ with a negative polarity is applied to each electrode according to a value of a corresponding bit of the image signal from a driving circuit 100. Thereby, polarity inversion driving is performed, for example, for each frame.

A voltage applied to each of the electrodes 16A, 16B, 16C, 16D and 16E is controlled, and thereby it is possible to control the area of a region provided for display. In addition, in the following description, in a case where it is not necessary to differentiate the electrodes 16A, 16B, 16C, 16D and 16E from each other, they are simply referred to as a pixel electrode 16. In addition, description will be made assuming that the liquid crystal display 901 is driven in a normally white mode, but this is only an example.

Next, with reference to FIGS. 3A and 3B, a relationship between a liquid crystal applied voltage-reflectance curve and flickering will be described.

Figure 3A:
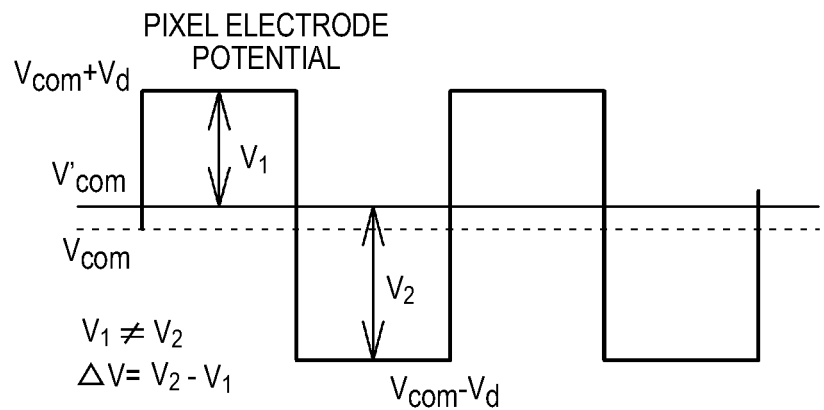
FIG. 3A is a schematic waveform diagram illustrating a potential difference between a common electrode and a pixel electrode according to inversion driving.

FIG. 3A is a schematic waveform diagram illustrating a potential difference between the common electrode and the pixel electrode according to the inversion driving. FIG. 3B is schematic graphs illustrating a relationship between a voltage applied to the liquid crystal material layer (liquid crystal applied voltage) and the reflectance, and a relationship between a variation in a liquid crystal applied voltage and a variation in the reflectance.

For example, if a potential of the common electrode varies from $V_{com}$ to $V_{com'}$, due to the liquid crystal display 901 being exposed to ambient light for a long time or the like, flickering occurs when black display is performed. In other words, as shown in FIG. 3A, a liquid crystal applied voltage $V_1$ in positive polarity driving and a liquid crystal applied voltage $V_2$ in negative polarity driving have different values, and thus a difference $\Delta V$ between the liquid crystal applied voltages occurs.

Figure 3B:
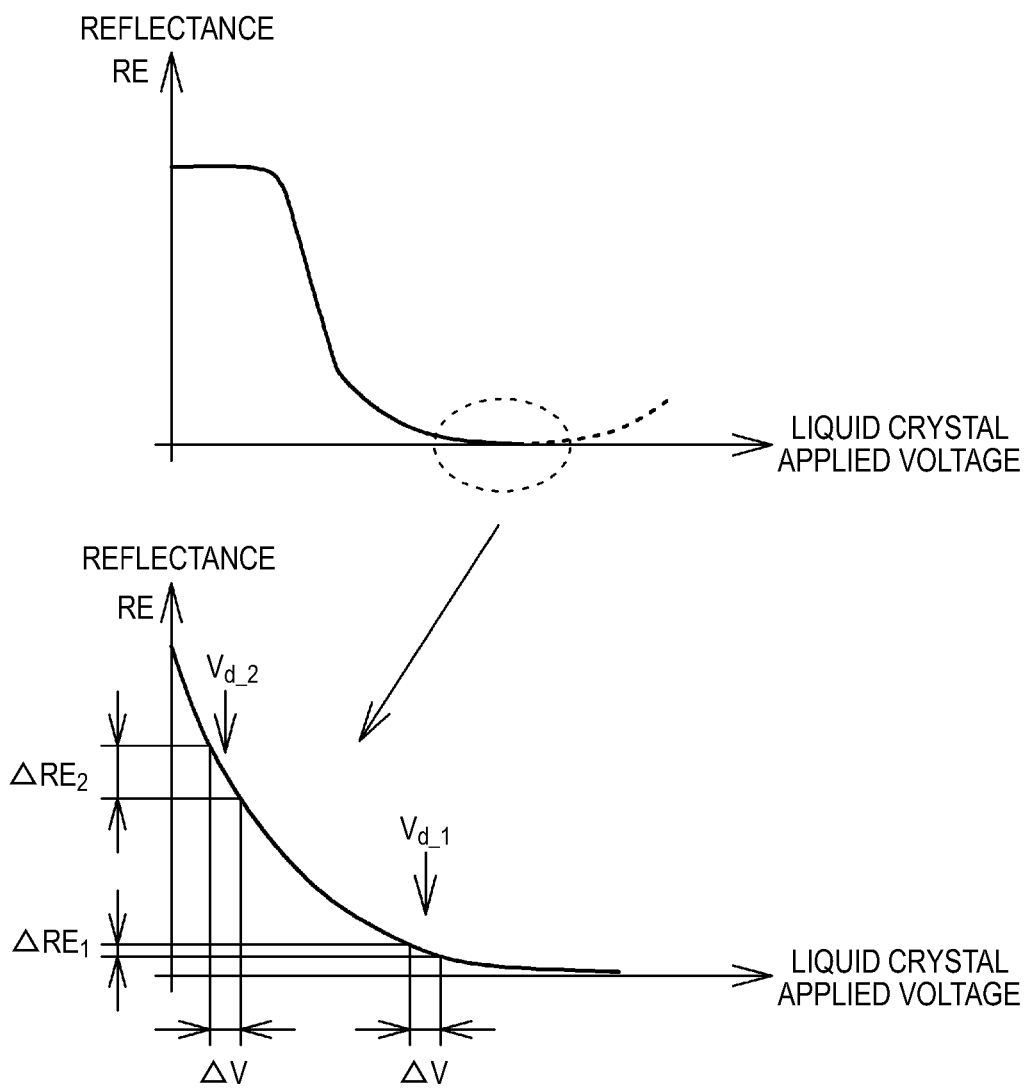
FIG. 3B is a schematic graph illustrating a relationship between a voltage applied to the liquid crystal material layer (liquid crystal applied voltage) and the reflectance, and a relationship between a variation in a liquid crystal applied voltage and a variation in the reflectance.

The graph on the upper part of FIG. 3B is a schematic graph of a liquid crystal applied voltage-reflectance curve. A variation in the reflectance due to the difference $\Delta V$ between the liquid crystal applied voltages can be reduced by setting a voltage $V_d$ to a value close to an extreme value of the liquid crystal applied voltage-reflectance curve.

The graph on the lower part of FIG. 3B shows reflectance variations caused by the difference $\Delta V$ in cases where the voltage $V_d$ is set to a voltage $V_d$ around an extreme value of the liquid crystal applied voltage-reflectance curve and is set to a value $V_{d\_2}$ distant from the extreme value. As is clear from the graphs, a reflectance variation $\Delta RE_1$ in a case where the voltage $V_d$ is set to a value $V_{d\_1}$ is smaller than a reflectance variation $\Delta RE_2$ in a case where the voltage $V_d$ is set to a value $V_{d\_2}$. As such, even if the same difference $\Delta V$ occurs, it is possible to reduce occurrence of flickering due to the inversion driving by setting the voltage $V_d$ to a value around the extreme value of the liquid crystal applied voltage-reflectance curve. Particularly, it is not necessary to apply a voltage for intermediate grayscale display to the liquid crystal material layer 17 in a general area ratio grayscale method with MIP (Memory In Pixel), and thus flickering is further difficult to view. In addition, the liquid crystal display according to the embodiment of the present disclosure is not limited to a liquid crystal display of the area ratio grayscale method.

Next, an optical design of the liquid crystal display according to the reference example will be described. First, an example of the general optical design will be described with reference to FIGS. 4 and 5, and, then an example of the optical design for shifting an extreme value of the liquid crystal applied voltage-reflectance curve to a low voltage side will be described with reference to FIGS. 6 and 7.

FIG. 4 is a schematic graph illustrating how the relationship between the liquid crystal applied voltage and the reflectance varies when the liquid crystal display in which a certain design condition is applied to an optical member or the like is rotated. FIG. 5 is a schematic diagram illustrating an optical design of the liquid crystal display.

Details of the optical design will be described. As shown in FIG. 5, a polarization axis of the polarization plate 23 is set to form an angle of 35 degrees, a polarization axis of the ½ waveform plate 22 is set to form an angle of 50 degrees, and a polarization axis of the ¼ waveform plate 21 is set to form an angle of −70 degrees, with respect to the X axis. A rubbing direction in the alignment layer (not shown) on the rear substrate 14 side forms an angle of −128.5 degrees with respect to the X axis. In addition, a rubbing direction in the alignment layer (not shown) on the front substrate 18 side is set such that the liquid crystal molecules 17A are twisted by 63 degrees in the clockwise direction when viewed by an observer. FIG. 4 is a graph regarding the liquid crystal display 901 for which the above-described optical design is performed.

FIG. 4 shows a liquid crystal applied voltage-reflectance curve when the liquid crystal display 901 is rotated with respect to the Z axis as shown in FIGS. 1A and 1B. Specifically, FIG. 4 shows a liquid crystal applied voltage-reflectance curve when the liquid crystal display 901 is rotated by 0 degrees, a liquid crystal applied voltage-reflectance curve when the liquid crystal display 901 is rotated by 15 degrees, a liquid crystal applied voltage-reflectance curve when the liquid crystal display 901 is rotated by 30 degrees, and a liquid crystal applied voltage-reflectance curve when the liquid crystal display 901 is rotated by 50 degrees.

As is clear from the graph, in the optical design, a value where the liquid crystal applied voltage-reflectance curve becomes an extreme value does not vary much even if the liquid crystal display 901 is rotated. In addition, unless the liquid crystal applied voltage is set to a relatively high value (in the example shown in the figure, about 4.3 V), the liquid crystal applied voltage does not becomes a value around the extreme value of the liquid crystal applied voltage-reflectance curve. Therefore, in the design condition shown in FIG. 4, if the voltage $V_d$ is intended to be set to a value around the extreme value of the liquid crystal applied voltage-reflectance curve, the power consumption is increased. In addition, for example, if the liquid crystal applied voltage is set to a relatively low value (in the example shown in the figure, about 3.3 V), a reflectance variation caused by the difference $\Delta V$ between liquid crystal applied voltages due to the polarity inversion driving is increased. Further, the difference $\Delta V$ shown in FIG. 4 is schematically shown and is only an example. This is also the same for FIG. 6 described later.

Figure 6:
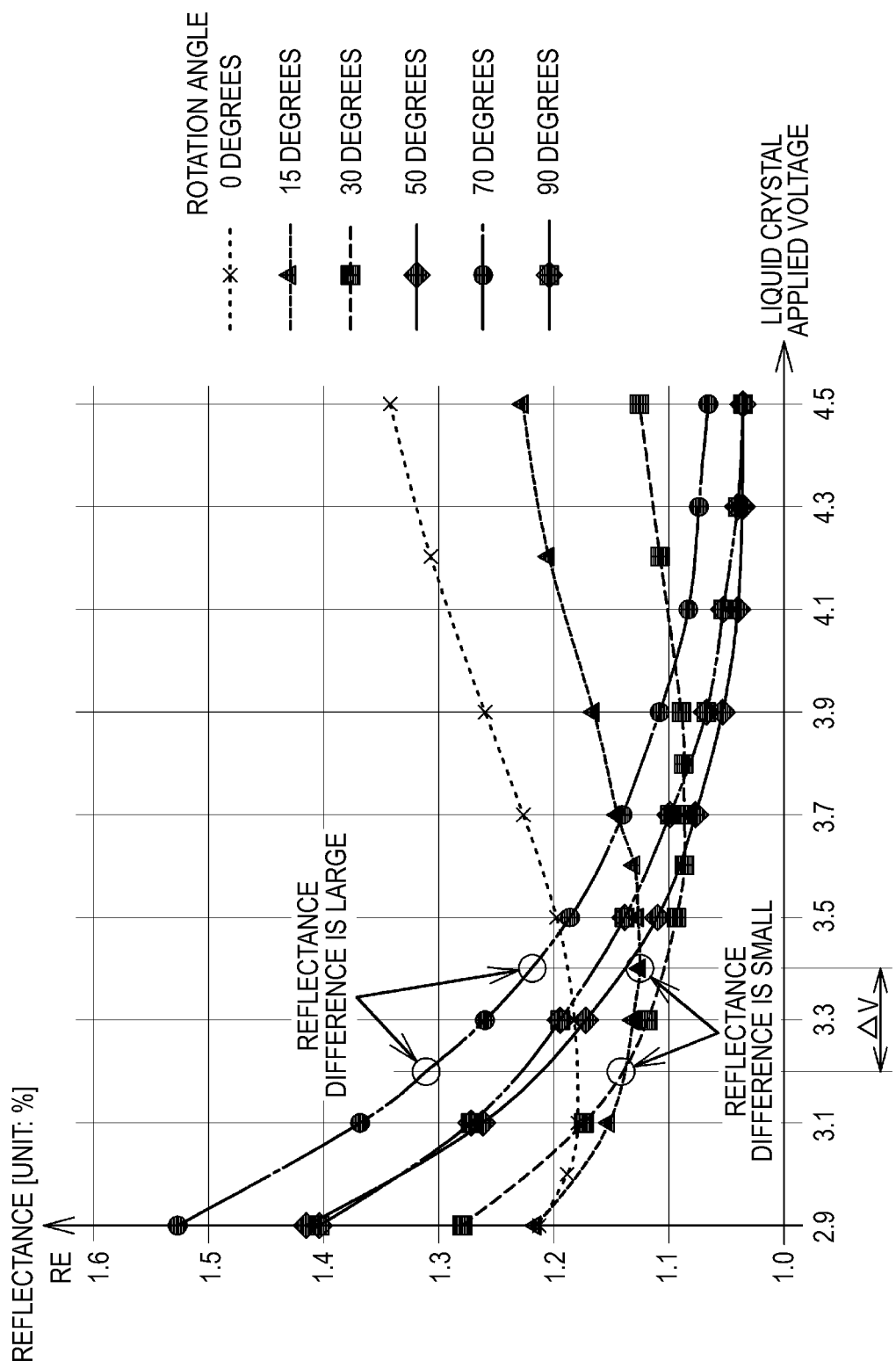
FIG. 6 is a schematic graph illustrating how the relationship between the liquid crystal applied voltage and the reflectance varies when the liquid crystal display in which a certain design condition different from that of FIG. 4 is applied to the optical member or the like is rotated.
Figure 7:
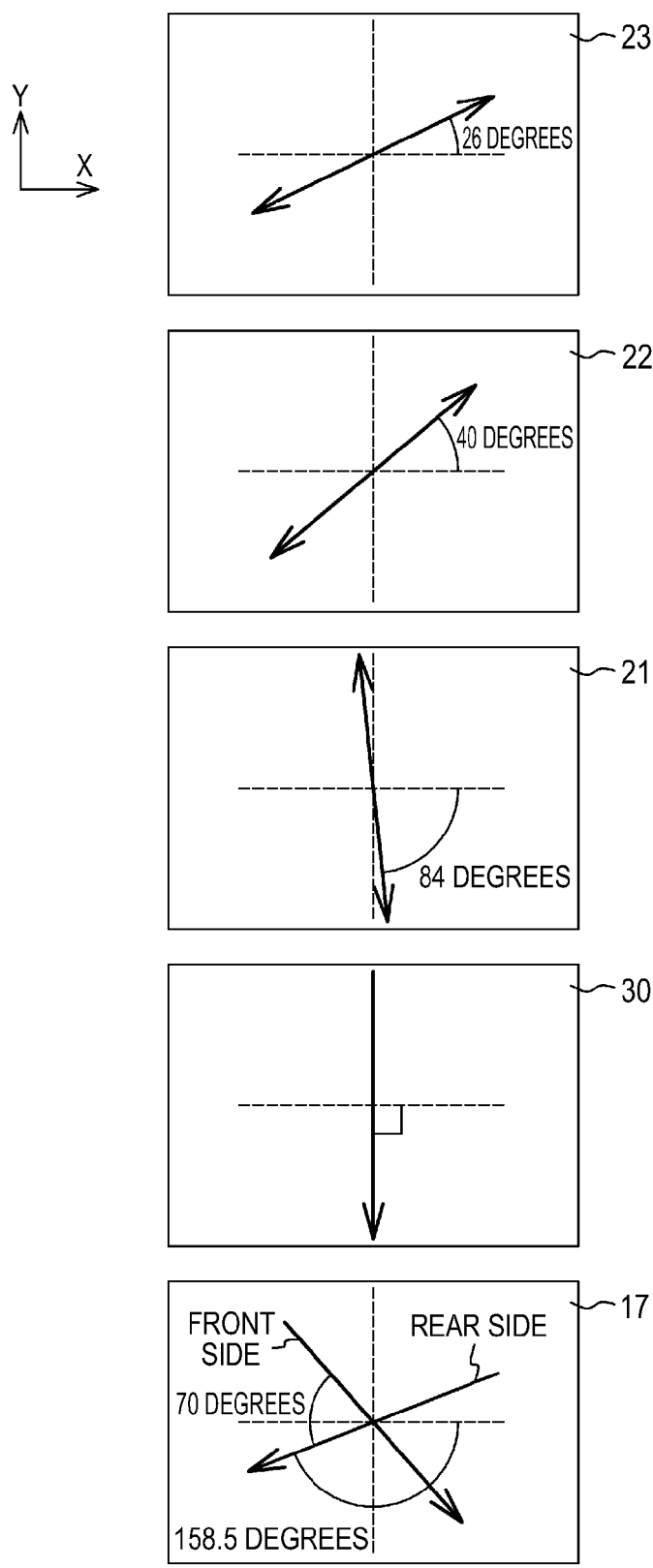
FIG. 7 is a schematic diagram illustrating an optical design of the liquid crystal display.

FIG. 6 is a schematic graph illustrating how the relationship between the liquid crystal applied voltage and the reflectance varies when the liquid crystal display in which a certain design condition different from that of FIG. 4 is applied to the optical member or the like is rotated. FIG. 7 is a schematic diagram illustrating an optical design of the liquid crystal display.

Details of the optical design will be described. As shown in FIG. 7, a polarization axis of the polarization plate 23 is set to form an angle of 26 degrees, a polarization axis of the ½ waveform plate 22 is set to form an angle of 40 degrees, and a polarization axis of the ¼ waveform plate 21 is set to form an angle of −84 degrees, with respect to the X axis. A rubbing direction in the alignment layer (not shown) on the rear substrate 14 side forms an angle of −158.5 degrees with respect to the X axis. In addition, a rubbing direction in the alignment layer (not shown) on the front substrate 18 side is set such that the liquid crystal molecules 17A are twisted by 70 degrees in the clockwise direction when viewed by an observer. FIG. 6 is a graph regarding the liquid crystal display 901 for which the above-described optical design is performed.

FIG. 6 also additionally shows a liquid crystal applied voltage-reflectance curve when the liquid crystal display 901 is rotated by 70 degrees and by 90 degrees with respect to the Z axis.

As is clear by comparing the characteristics shown in FIG. 4, in the characteristics shown in FIG. 6, a value of the liquid crystal applied voltage where the liquid crystal applied voltage-reflectance curve becomes an extreme value is varied by changing a rotation angle of the liquid crystal display 901. In addition, it can be seen that the extreme value of the liquid crystal applied voltage-reflectance curve when a rotation angle is small is shifted to a low voltage side. For example, when attention is paid to the liquid crystal applied voltage-reflectance curve with the rotation angle 15 degrees, a reflectance variation caused by the difference ΔV between liquid crystal applied voltages due to the polarity inversion driving is small even if a liquid crystal applied voltage is set to a relatively low value (in the example shown in the figure, 3.3 V).

For example, if an optical design is configured to be entirely shifted by 15 degrees such that the characteristics indicated by the liquid crystal applied voltage-reflectance curve with the rotation angle 15 degrees shown in FIG. 6 are expressed without rotating the liquid crystal display, it is possible to shift an extreme value of the liquid crystal applied voltage-reflectance curve in a state of being observed from a normal observing direction (for example, a direction of the polar angle 0 degrees) to a low voltage. In the liquid crystal display configured in this way, it is possible to reduce power consumption while setting the voltage $V_d$ to a value around an extreme value of the liquid crystal applied voltage-reflectance curve. However, for example, the characteristics at the rotation angle 70 degrees shown in FIG. 6 are expressed at the rotation angle 55 degrees. Therefore, there is a problem in that flickering is viewed in a case where the liquid crystal display is observed from a direction different from the normal observing direction, for example, from an obliquely transverse direction. Next, a liquid crystal display according to a first embodiment for solving the above-described problem will be described.

First Embodiment

The first embodiment of the present disclosure relates to a display device.

Figure 8:
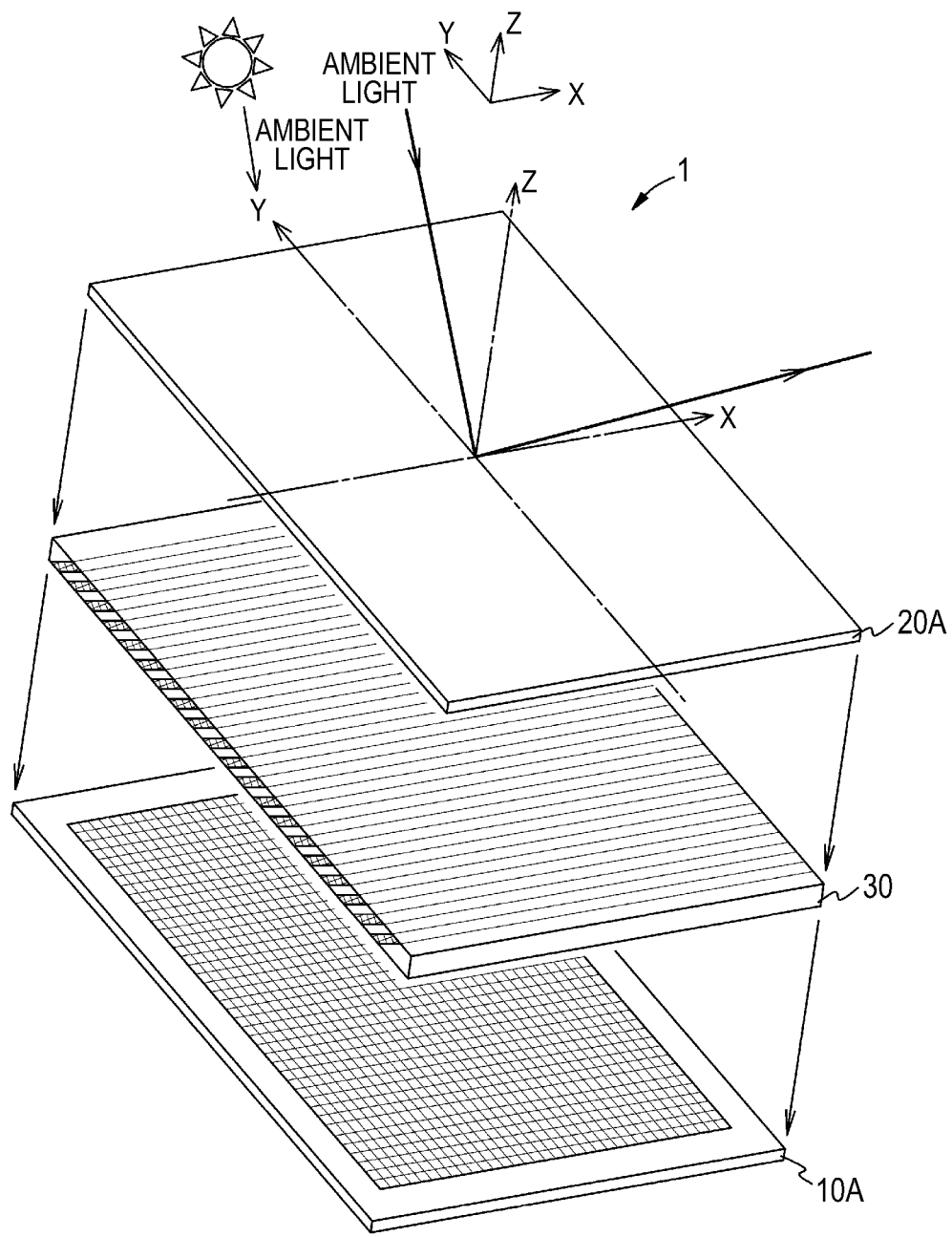
FIG. 8 is a schematic exploded perspective view illustrating a liquid crystal display according to a first embodiment.

FIG. 8 is a schematic exploded perspective view illustrating a liquid crystal display according to the first embodiment.

A liquid crystal display 1 according to the first embodiment basically has a configuration in which an anisotropic scatterer is added to the liquid crystal display 901 described in the reference example. Specifically, the anisotropic scatterer is further provided on the front substrate side of the liquid crystal display which has a configuration in which an optical design is shifted such that the characteristics indicated by the liquid crystal applied voltage-reflectance curve with the rotation angle 15 degrees shown in FIG. 6 are shown without rotating the liquid crystal display.

Figure 11:
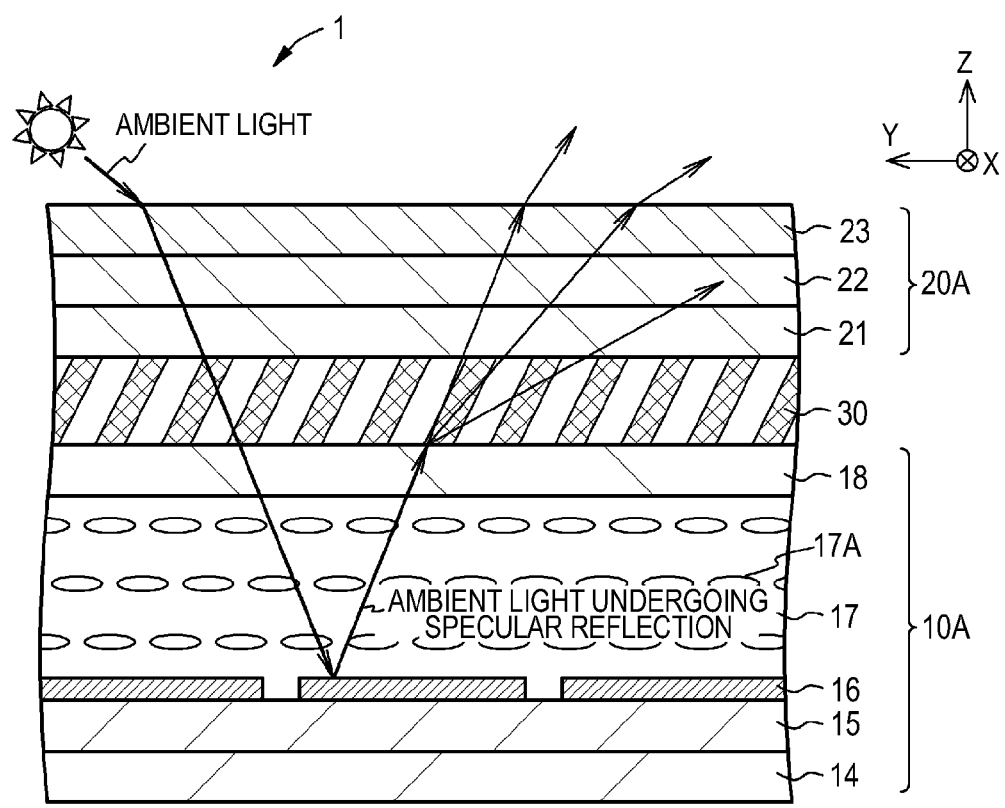
FIG. 11 is a schematic cross-sectional view of the liquid crystal display according to the first embodiment.

The reference numeral 10A shown in FIG. 8 indicates a portion including the front substrate 18, the rear substrate 14, and the liquid crystal material layer 17 disposed between the front substrate 18 and the rear substrate 14 which form the liquid crystal display for which the above-described optical design has been performed. Similarly, the reference numeral 20A shown in FIG. 8 indicates a portion including a ¼ waveform plate 21, a ½ waveform plate 22, and a polarization plate 23 which form the liquid crystal display for which the above-described optical design has been performed. An anisotropic scatterer 30 is disposed on the front substrate 18 side, more specifically, between the front substrate 18 and the ¼ waveform plate 21 as shown in FIG. 11 described later.

As such, the liquid crystal display 1 is a reflective liquid crystal display including the front substrate 18, the rear substrate 14, and the liquid crystal material layer 17 disposed between the front substrate 18 and the rear substrate 14. In addition, an optical design is performed such that an extreme value of a liquid crystal applied voltage-reflectance curve in a state of being observed from a normal observing direction (for example, a direction of the polar angle 0 degrees) is shifted further to a low voltage side than an extreme value of a liquid crystal applied voltage-reflectance curve in a state of being observed from a direction deviated from the normal observing direction.

FIG. 9A is a schematic perspective view illustrating a structure of the liquid crystal display. FIG. 9B is a schematic cross-sectional view illustrating a structure of the anisotropic scatterer according to the first embodiment. FIGS. 9C and 9D are schematic perspective views illustrating a disposition of a low refractive index region and a high refractive index region in the anisotropic scatterer.

The anisotropic scatterer 30 shown in FIG. 8 or 9A has a sheet shape (film shape) with the thickness of, for example, 0.02 to 0.5 [mm] Although a detailed description is made referring to FIGS. 12A to 12C described later, the anisotropic scatterer 30 is disposed such that a direction where scattering characteristics are the maximum is aligned with the normal observing direction.

As shown in FIG. 9B, an in-plane direction region of the anisotropic scatterer 30 is formed as a region in which low refractive index regions 31 and high refractive index regions 32 are mixed, for example, at the order of microns. In addition, there may be a configuration of being mixed at the order of microns or less. Further, for simplicity of illustration, in FIGS. 9A to 9D, a transparent film and the like which form a base of the anisotropic scatterer 30 are not shown.

The anisotropic scatterer 30 is formed using a composition or the like including a photoreactive compound. For example, as shown in FIG. 9C, the anisotropic scatterer 30 may have a configuration in which the low refractive index regions 31 and the high refractive index regions 32 are formed in a louver shape, and, as shown in FIG. 9D, the anisotropic scatterer 30 may have a configuration in which the low refractive index regions 31 and the high refractive index regions 32 form columnar regions and peripheral regions surrounding them. FIG. 9D shows an example of the case where, for example, a composition portion having undergone photoreaction has a high refractive index in a columnar region form.

FIG. 9C shows that the width of each of the low refractive index regions 31 in the thickness direction or the width of each of the high refractive index regions 32 in the thickness direction is constant, but this is only an example. Similarly, FIG. 9D shows that the shapes of the column regions are the same, but this is also only an example.

As shown in FIGS. 9B to 9D, inside the anisotropic scatterer 30, the low refractive index regions 31 and the high refractive index regions 32 are formed in a tilt direction such that a boundary between the low refractive index region 31 and the high refractive index region 32 forms an angle θ with respect to the thickness direction (Z direction) of the anisotropic scatterer 30. The angle θ is set to an appropriately preferable value depending on the specification of the anisotropic scatterer 30.

For convenience of description, here, the low refractive index regions 31 and the high refractive index regions 32 are formed in a louver shape as shown in FIG. 9C, and a direction where the louver-shape regions extend is set to be parallel to the X direction. In addition, a description will be made assuming that the high refractive index region 32 is a region where a base material produces photoreaction, but this is only an example. A region where a base material produces photoreaction may be the low refractive index region 31.

Here, a relationship between incident light and scattered light in the anisotropic scatterer will be described with reference to FIG. 10.

Figure 10:
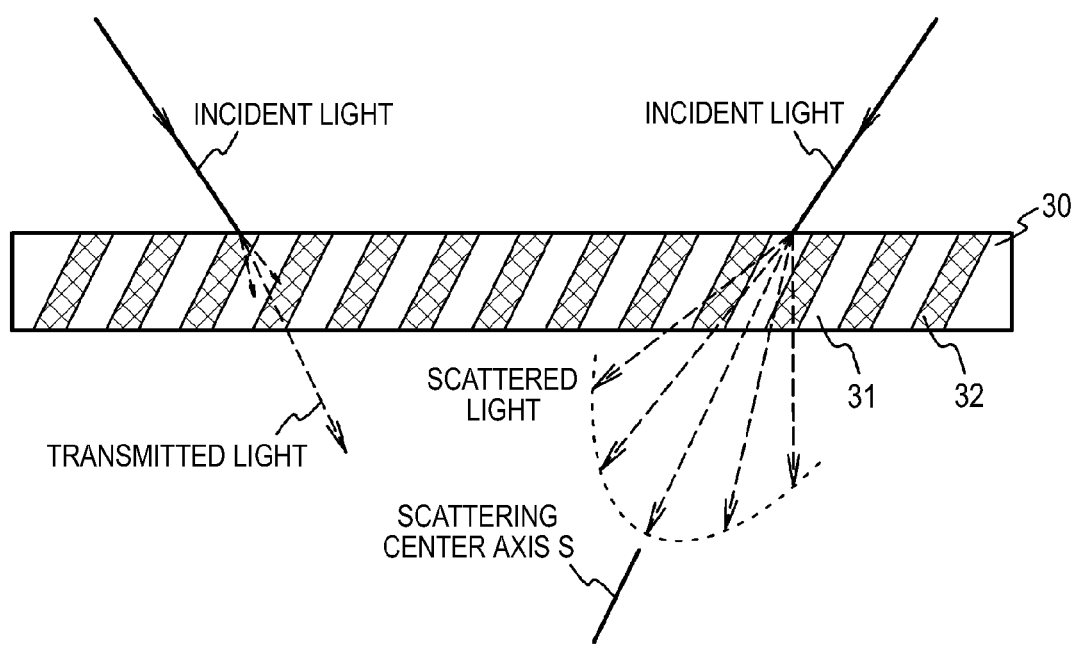
FIG. 10 is a schematic diagram illustrating a relationship between incident light and scattered light in the anisotropic scatterer.

As shown in FIG. 10, in a case where, in the anisotropic scatterer 30, light is incident from a direction substantially following the direction where the boundary between the low refractive index region 31 and the high refractive index region 32 extends, the light is scattered and is emitted. On the other hand, light is incident from a direction substantially perpendicular to the direction where the boundary between the low refractive index region 31 and the high refractive index region 32 extends, the light is transmitted as it is.

In addition, a scattering center axis S (an axis where an anisotropic scattering characteristic of light which is incident centering thereon is substantially symmetrical; in other words, an axis which extends in an incidence direction of most scattered light) of the anisotropic scatterer 30 is obliquely tilted with respect to the Z axis direction, but, qualitatively, it is considered that an axial direction thereof is a direction substantially following the extending direction of the low refractive index regions 31 and the high refractive index regions 32. Further, in this case, it is considered that the azimuth where the scattering center axis S is projected onto the X-Y plane is in a direction perpendicular to the direction where the louver-shape regions extend in the case shown in FIG. 9C, and is in a direction where, when the columnar region is projected onto the X-Y plane, a shadow thereof extends in the case shown in FIG. 9D. A plane including the scattering center axis S is parallel to the Y-Z plane.

The anisotropic scatterer 30 is disposed such that ambient light which is reflected on the rear substrate 14 side is incident on the anisotropic scatterer 30 and is scattered when emitted to the outside (hereinafter, referred to as "an emission scattering configuration" in some cases).

Behaviors of light in the liquid crystal display 1 will be described with reference to FIGS. 11 to 12C.

FIG. 11 is a schematic cross-sectional view of the liquid crystal display according to the first embodiment. FIGS. 12A to 12C are schematic diagrams illustrating characteristics of the anisotropic scatterer.

The anisotropic scatterer 30 shows anisotropy in light scattering. Therefore, the liquid crystal display 1 including the anisotropic scatterer 30 is considerably different in light reflection characteristics in a case where light is incident on the plane including the scattering center axis S of the anisotropic scatterer and in a case where light is not incident thereon.

Figure 12A:
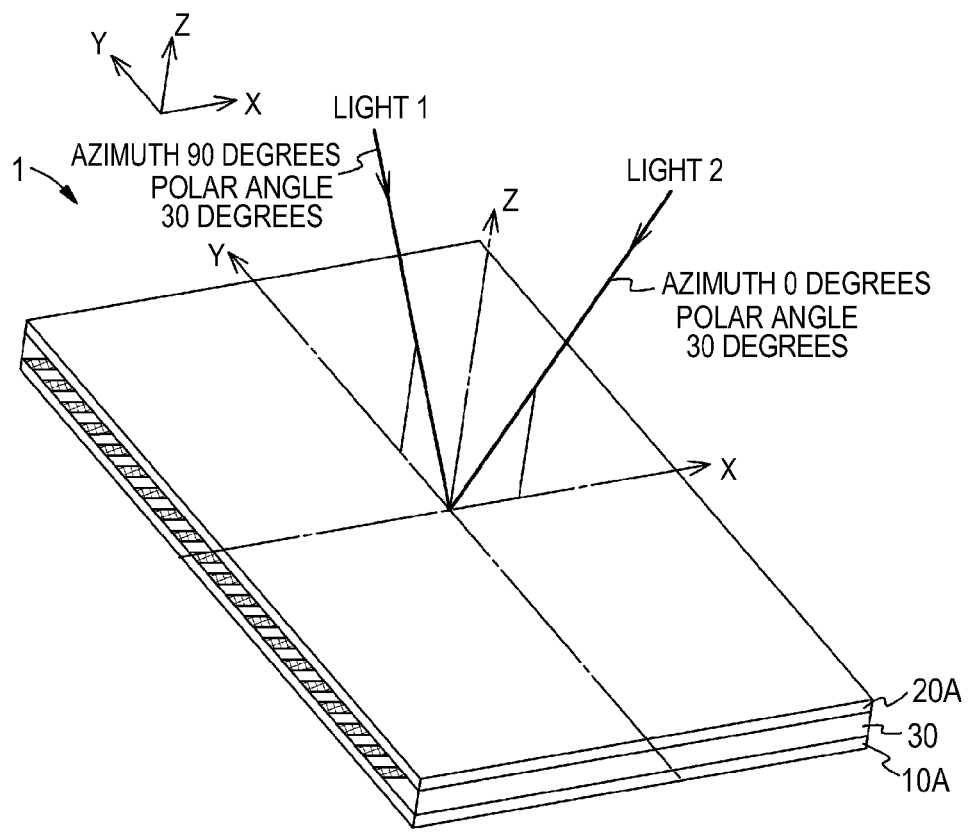
FIGS. 12A to 12C are schematic diagrams and the like illustrating characteristics of the anisotropic scatterer.
Figure 12B:
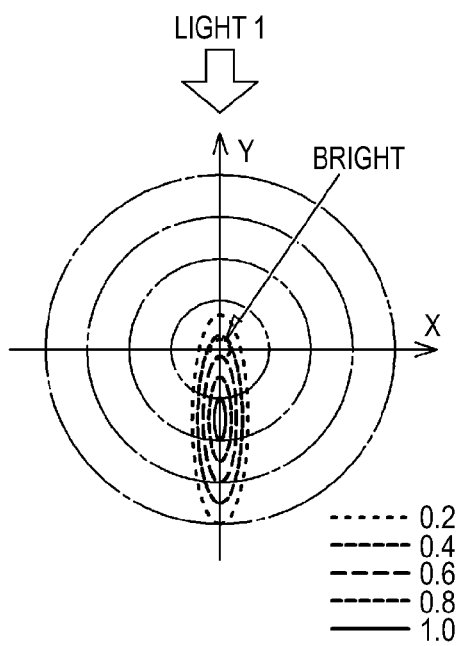

For example, in a state where the liquid crystal display 1 performs white display, as shown in FIG. 12A, light 1 is incident at the azimuth 90 degrees and the polar angle 30 degrees, and, in a case where the intensity of emitted light is observed at an observing position of the polar angle 0 degrees, a characteristic as in FIG. 12B is shown. In addition, FIG. 12B shows a normalized value. In contrast, in a case where the azimuth is changed (for example, 0 degrees) and light 2 is incident, a characteristic as in FIG. 12C is shown.

Figure 12C:
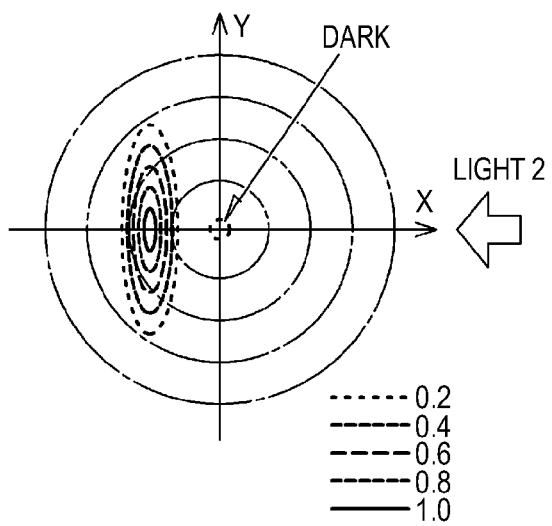

As such, the liquid crystal display 1 using the anisotropic scatterer 30 has angle dependency in the light scattering characteristic, and thus shows a characteristic of strengthening light in a predetermined direction (the in-plane direction perpendicular to the plane of the paper in the example shown in FIGS. 12A to 12C) and of weakening light in a direction deviated from the predetermined direction. Thereby, flickering when the liquid crystal display 1 is observed from another direction different from the normal observing direction is reduced. Hereinafter, a description thereof will be made with reference to FIGS. 13A to 14B.

Figure 13A:
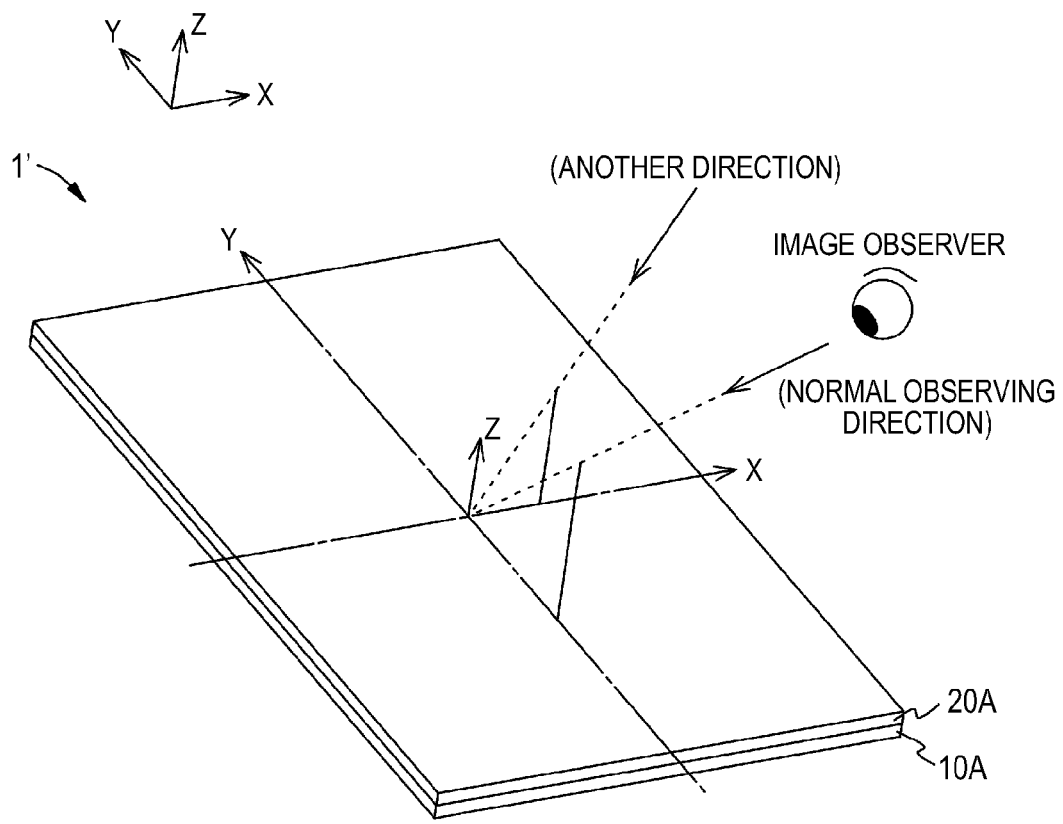
FIG. 13A is a schematic perspective view illustrating a positional relationship between cases where a liquid crystal display from which the anisotropic scatterer is omitted is observed from a normal observing direction and is observed from another direction.
Figure 13B:
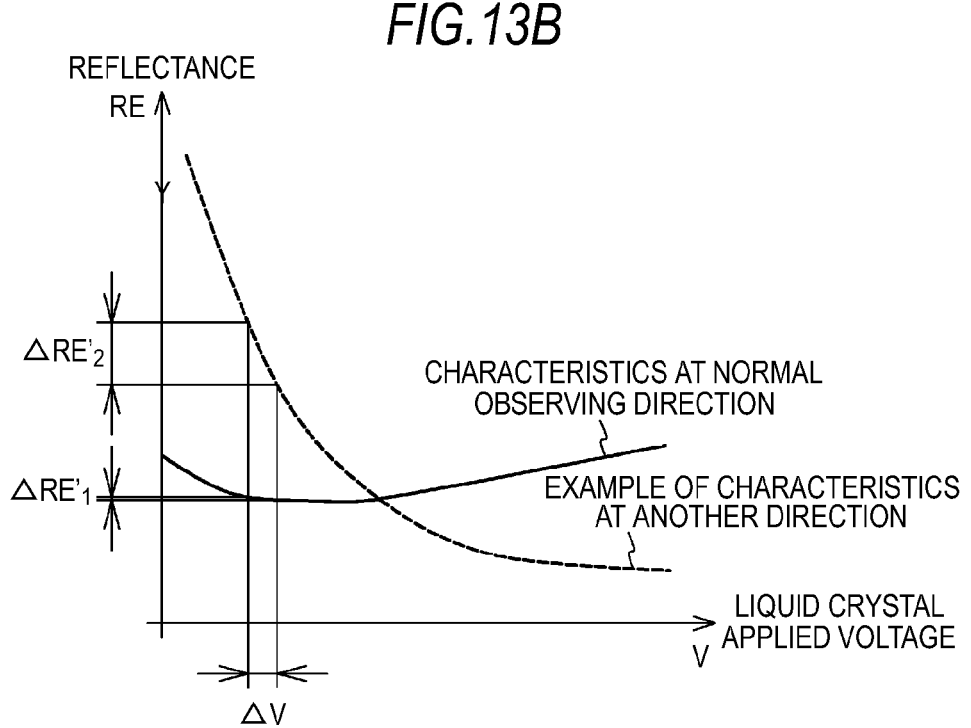
FIG. 13B is a schematic graph of a liquid crystal applied voltage-reflectance curve in the liquid crystal display from which the anisotropic scatterer is omitted.

FIG. 13A is a schematic perspective view illustrating a positional relationship between cases where a liquid crystal display from which the anisotropic scatterer is omitted is observed from a normal observing direction and is observed from another direction. FIG. 13B is a schematic graph of a liquid crystal applied voltage-reflectance curve in the liquid crystal display from which the anisotropic scatterer is omitted.

In a liquid crystal display 1' which has a configuration where the anisotropic scatterer 30 is omitted from the liquid crystal display 1, flickering is viewed in a case of being observed from another direction (for example, a direction of the polar angle 30 degrees and the azimuth 0 degrees) different from a normal observing direction (for example, the polar angle 30 degrees and the azimuth 270 degrees). That is to say, as shown in FIG. 13B, a reflectance variation $\Delta RE_2'$ due to the difference $\Delta V$ between liquid crystal applied voltages when observation is performed from another direction is much larger than a variation $\Delta RE_1'$ when observation is performed from the normal observing direction.

Figure 14A:
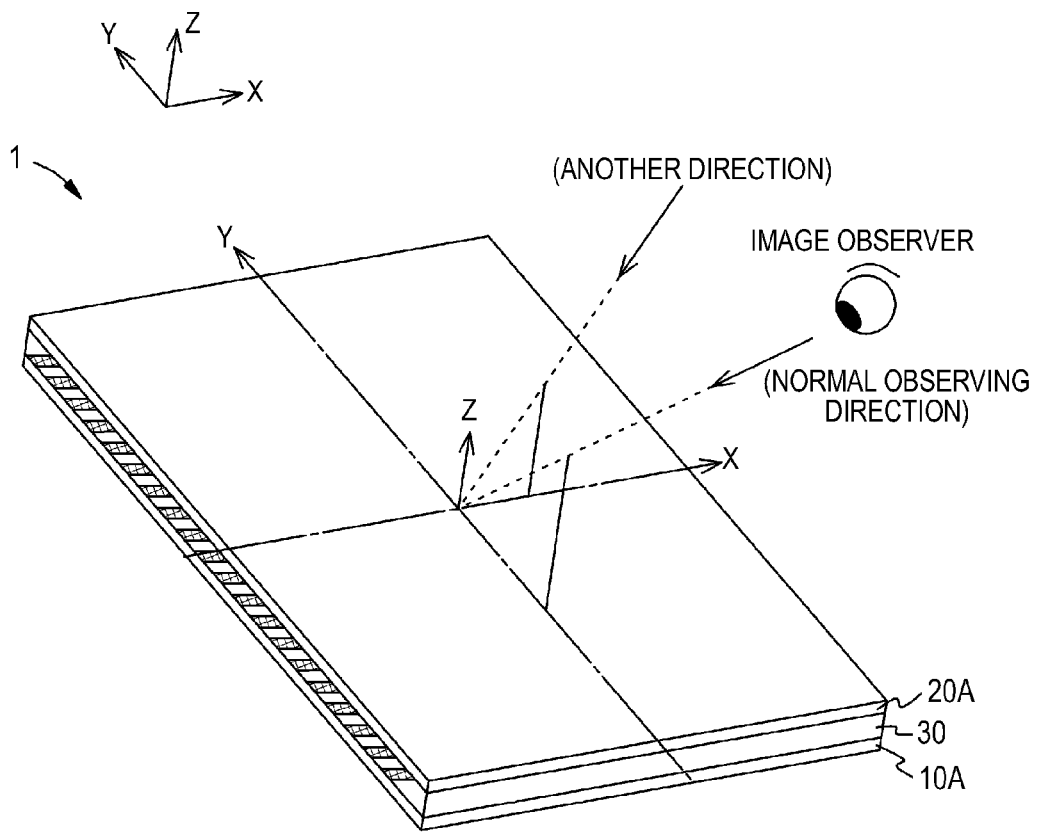
FIG. 14A is a schematic perspective view illustrating a positional relationship between cases where the liquid crystal display according to the first embodiment is observed from a normal observing direction and is observed from another direction.
Figure 14B:
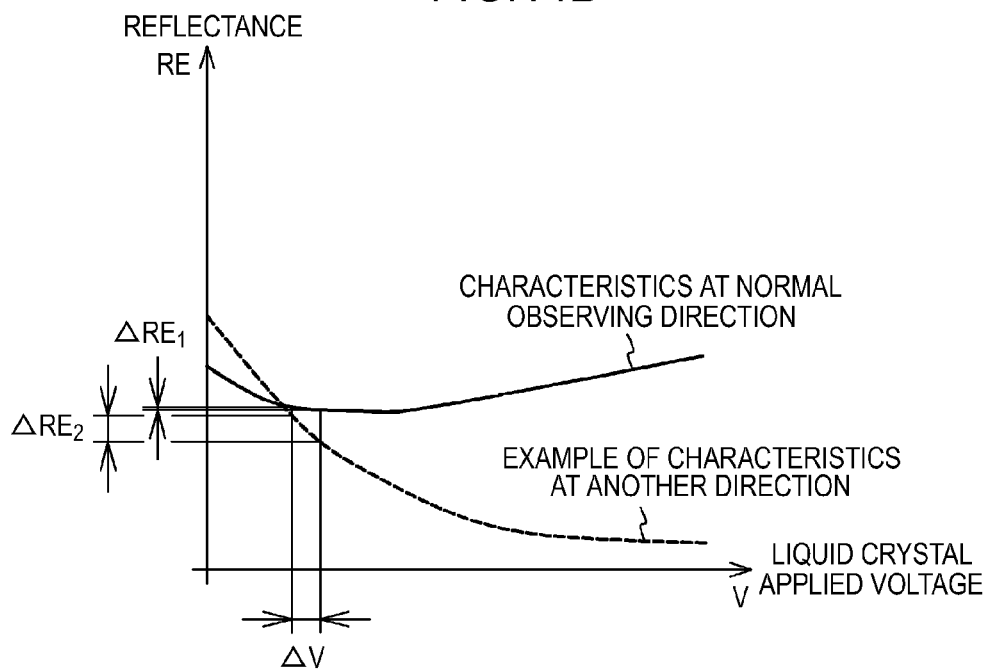
FIG. 14B is a schematic graph of a liquid crystal applied voltage-reflectance curve in the liquid crystal display according to the first embodiment.

FIG. 14A is a schematic perspective view illustrating a positional relationship between cases where the liquid crystal display according to the first embodiment is observed from a normal observing direction and is observed from another direction. FIG. 14B is a schematic graph of a liquid crystal applied voltage-reflectance curve in the liquid crystal display according to the first embodiment.

The anisotropic scatterer 30 shows a characteristic of strengthening light in a direction toward a predetermined observing position and weakening light in a direction deviated from the predetermined observing position. Fundamentally, the closer to the scattering center axis S and the closer to the plane including the scattering center axis S (in the example shown in FIGS. 12A to 12C, the plane parallel to the Y-Z plane), the stronger the light intensity. Therefore, a reflectance variation $\Delta RE_2$ due to the difference $\Delta V$ between liquid crystal applied voltages when observation is performed from another direction (for example, a transverse direction) is smaller than the $\Delta RE_2'$ shown in FIGS. 14A and 14B. Thereby, flickering when observation is performed from another direction is reduced. A liquid crystal applied voltage-reflectance curve when observation is performed from the normal observing direction is shifted further upward than the liquid crystal applied voltage-reflectance curve shown in FIGS. 14A and 14B. Therefore, it is possible to increase the luminance of an image observed from a predetermined observing position.

As described above, the anisotropic scatterer 30 is disposed such that ambient light which is reflected on the rear substrate 14 side is incident on the anisotropic scatterer 30 and is scattered when emitted to the outside. In contrast, there may be a configuration in which ambient light incident from the outside is incident on the anisotropic scatterer 30 and is scattered when directing toward the rear substrate 14 side (hereinafter, referred to as an "incidence scattering configuration" in some cases), but an image is slightly darkened. In the following, a description thereof will be made with reference to FIGS. 15A and 15B.

Figure 15A:
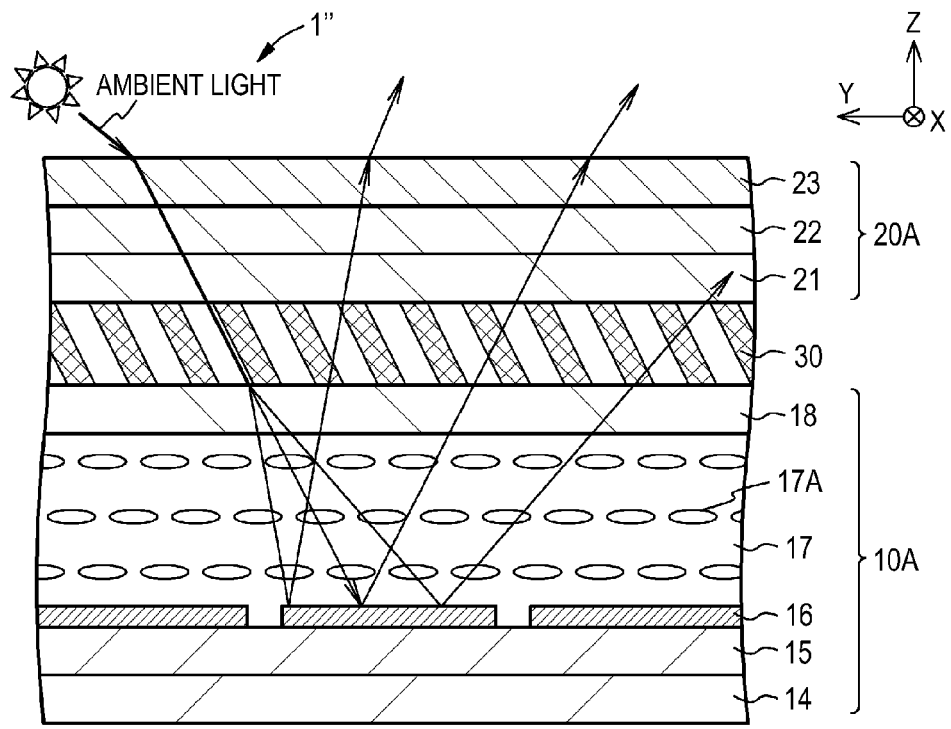
FIG. 15A is a schematic cross-sectional view of a liquid crystal display according to a reference example.

FIG. 15A is a cross-sectional view of a liquid crystal display 1" with a configuration in which a disposition of the anisotropic scatterer 30 is changed, and ambient light from the outside is scattered when the ambient light is incident on the anisotropic scatterer 30.

In the liquid crystal display 1", the scattered light is incident on the pixel electrode 16 and is reflected toward the front substrate side. Therefore, the light is more widely scattered than in the liquid crystal display 1 shown in FIG. 11.

Figure 15B:
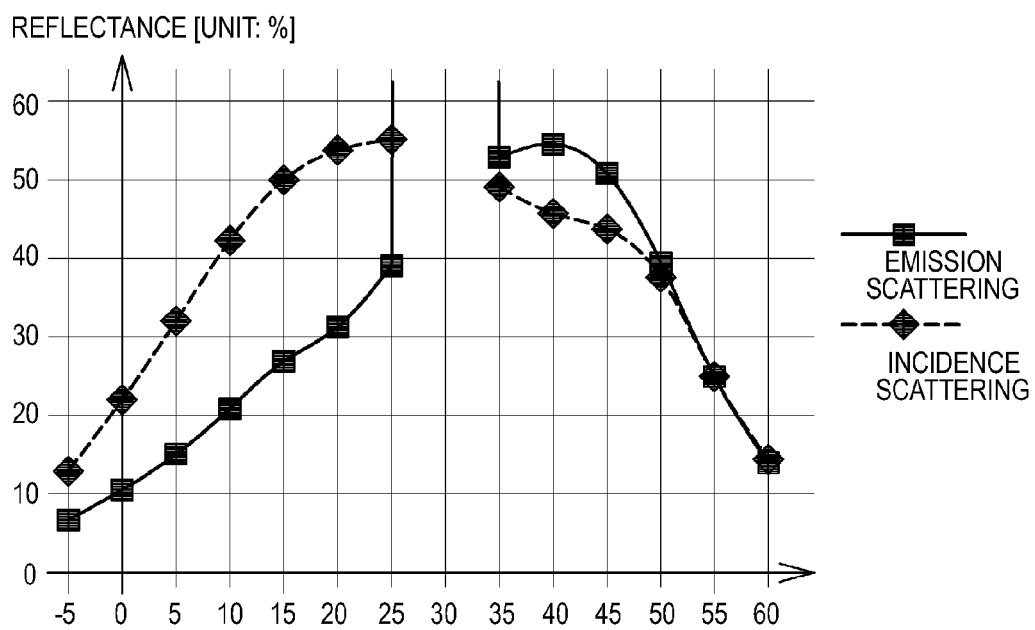
FIG. 15B is a graph which compares the reflectance characteristics between the liquid crystal display shown in FIG. 11 and the liquid crystal display shown in FIG. 15A.

FIG. 15B is a graph which compares the reflectance characteristics between the liquid crystal display shown in FIG. 11 and the liquid crystal display shown in FIG. 15A.

As is clear from the graph, the liquid crystal display 1 with the emission scattering configuration shown in FIG. 11 has the higher reflectance than the liquid crystal display 1" with the incidence scattering configuration. Therefore, the liquid crystal display 1 with the emission scattering configuration has an advantage in that the luminance of a displayed image can be further increased.

Figure 16:
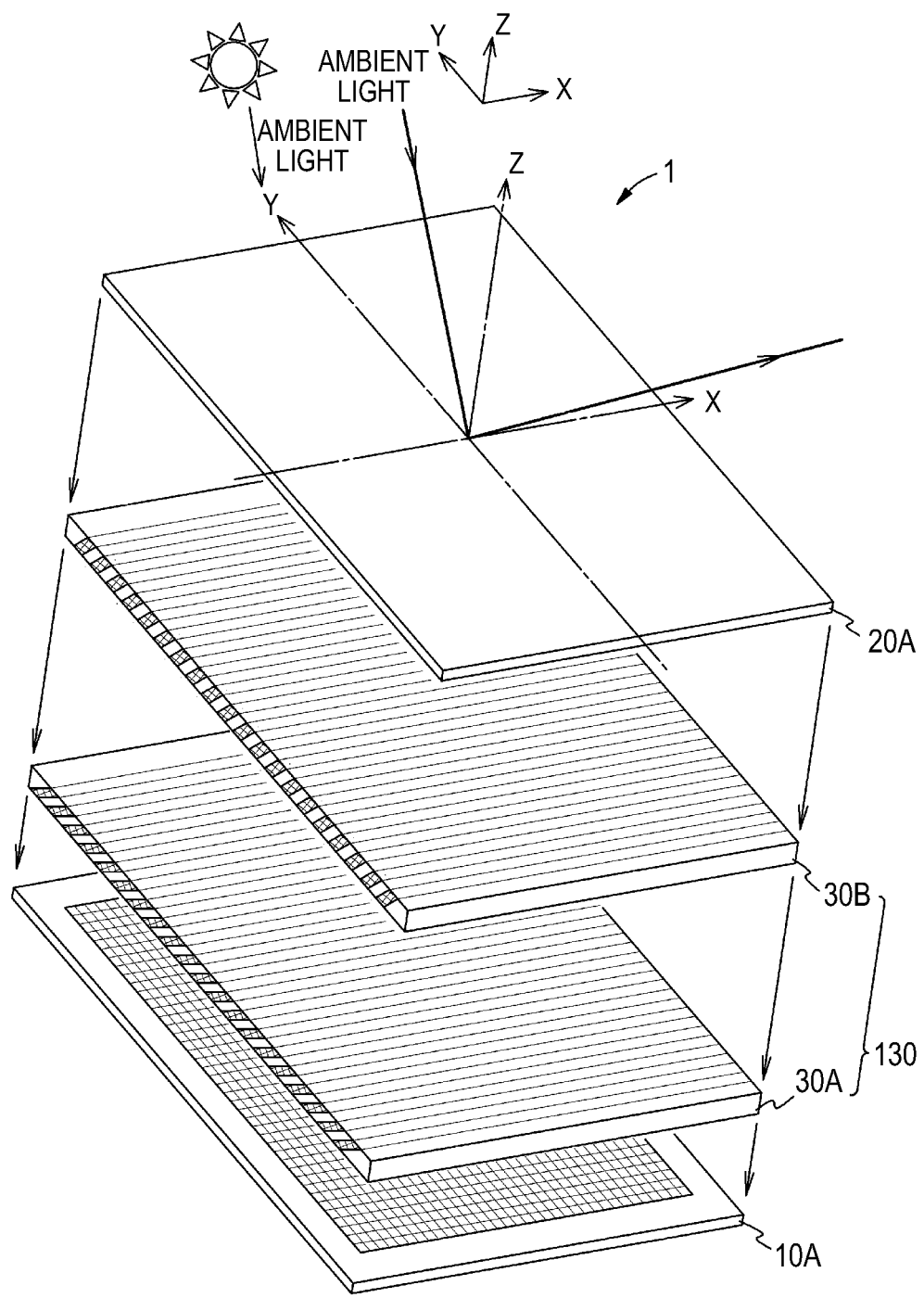
FIG. 16 is a schematic exploded perspective view illustrating a liquid crystal display according to a modified example.

In addition, in order to enlarge a scattering range or reduce an iridescent color, the anisotropic scatterer may have a structure formed by laminating a plurality of scattering members. FIG. 16 shows a schematic exploded perspective view of a liquid crystal display having an anisotropic scatterer with the above-described configuration.

In FIG. 16, an anisotropic scatterer 130 is formed by laminating scattering members 30A and 30B. The scattering members 30A and 30B basically have the same configuration as the anisotropic scatterer 30. For example, by giving some differences in directions of scattering center axes of the scattering members 30A and 30B, it is possible to adjust a diffusion range of light.

As above, although the embodiment of the present disclosure has been described in detail, the present disclosure is not limited to the above-described embodiment and may be variously modified based on the technical scope of the present disclosure.

For example, although, in the above-described embodiment, the anisotropic scatterer is disposed between the front substrate 18 and the ¼ waveform plate 21, this is only an example. A location at which the anisotropic scatterer is disposed may be appropriately determined depending on a design or a specification of the liquid crystal display.

In addition, the present disclosure may be implemented as the following configurations.

(1) A liquid crystal display which is a reflective liquid crystal display, including a front substrate; a rear substrate; and a liquid crystal material layer disposed between the front substrate and the rear substrate, wherein an optical design is performed such that an extreme value of a liquid crystal applied voltage-reflectance curve in a state of being observed from a normal observing direction is shifted further to a lower voltage side than an extreme value of a liquid crystal applied voltage-reflectance curve in a state of being observed from a direction deviated from the normal observing direction, and wherein an anisotropic scatterer disposed such that a direction where scattering characteristics are the maximum is aligned with the normal observing direction is provided on the front substrate side.

(2) The liquid crystal display set forth in (1), wherein an in-plane direction region of the anisotropic scatterer is formed as a region in which low refractive index regions and high refractive index regions are mixed.

(3) The liquid crystal display set forth in (2), wherein the anisotropic scatterer is disposed such that ambient light which is reflected on the rear substrate side is incident on the anisotropic scatterer and is scattered when emitted to outside.

(4) The liquid crystal display set forth in (3), wherein the ambient light reflected on the rear substrate side is incident from a surface side of which an extent of a reflectance variation around a boundary between the low refractive index region and the high refractive index region is relatively large on the anisotropic scatterer, and is emitted from a surface side of which an extent of a reflectance variation around the boundary between the low refractive index region and the high refractive index region is relatively small.

(5) The liquid crystal display set forth in (1), wherein the anisotropic scatterer is formed by laminating a plurality of scattering members.

(6) The liquid crystal display set forth in (1), wherein the liquid crystal display performs grayscale display using an area ratio grayscale method.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A liquid crystal display which is a reflective liquid crystal display, comprising:
a front substrate;
a rear substrate; and
a liquid crystal material layer disposed between the front substrate and the rear substrate,
wherein an optical design is performed such that an extreme value of the liquid crystal applied voltage-reflectance curve varies depending on states of observing directions,
wherein the optical design is performed such that the extreme value of the liquid crystal applied voltage-reflectance curve in a state observed from a normal observing direction is shifted further to a lower voltage side than an extreme value of a liquid crystal applied voltage-reflectance curve in a state observed from a direction deviated from the normal observing direction,
wherein an anisotropic scatterer is disposed such that a direction where scattering characteristics are the maximum is aligned with the normal observing direction is provided on a front substrate side of the front substrate,
wherein the anisotropic scatterer includes low refractive index regions and high refractive index regions,
wherein high-low-index boundaries are disposed between the low refractive index regions and high refractive index regions, and
wherein the anisotropic scatterer is disposed such that ambient light is scattered when light is incident from a direction substantially following the direction that the high-low-index boundaries extend, and such that the light is transmitted when light is incident from a direction substantially perpendicular to the direction that the high-low-index boundaries extends.

2. The liquid crystal display according to claim 1, wherein the anisotropic scatterer is disposed such that ambient light, which is reflected on a front surface side of the rear substrate and is incident on the anisotropic scatterer, is scattered when emitted toward the front substrate side.

3. The liquid crystal display according to claim 1, wherein the anisotropic scatterer is formed by laminating a plurality of scattering members.

4. The liquid crystal display according to claim 1, wherein the liquid crystal display performs grayscale display using an area ratio grayscale method.

5. The liquid crystal display according to claim 1, wherein the extreme value of the liquid crystal applied voltage-reflectance curve in a state observed from a normal observing direction is Vd, and
a polarity inversion driving is performed by applying the liquid crystal material layer with a voltage of a range of −Vd to +Vd.

6. The liquid crystal display according to claim 5, wherein Vd is in a range of 2.5V to 3.5V.

7. The liquid crystal display according to claim 5, wherein a polarity inversion driving is performed by applying the liquid crystal material layer with a voltage of one of −Vd, zero, and +Vd.

* * * * *